United States Patent
Moret et al.

(10) Patent No.: US 12,345,931 B2
(45) Date of Patent: Jul. 1, 2025

(54) OPTICAL CIRCUIT WITH OPTICAL PORT IN SIDEWALL

(71) Applicant: Intel Corporation, Santa Clara, CA (US)

(72) Inventors: Eric J. M. Moret, Beaverton, OR (US); Srinivas Venkata Ramanuja Pietambaram, Chandler, AZ (US); Tarek A. Ibrahim, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 17/479,334

(22) Filed: Sep. 20, 2021

(65) Prior Publication Data
US 2023/0092060 A1 Mar. 23, 2023

(51) Int. Cl.
*G02B 6/42* (2006.01)
(52) U.S. Cl.
CPC .......... *G02B 6/423* (2013.01); *G02B 6/4214* (2013.01); *G02B 6/4232* (2013.01)
(58) Field of Classification Search
CPC ................. G02B 6/423; G02B 6/4232
See application file for complete search history.

(56) References Cited

U.S. PATENT DOCUMENTS

| 2007/0210400 | A1* | 9/2007 | Moribayashi | ........ G02B 6/4249 257/440 |
| 2014/0147075 | A1 | 5/2014 | Wessel | |
| 2016/0252688 | A1* | 9/2016 | Barwicz | ............... G02B 6/1225 385/14 |

FOREIGN PATENT DOCUMENTS

CN 115826154 3/2023

OTHER PUBLICATIONS

"European Application Serial No. 22184060.6, Extended European Search Report mailed Jan. 3, 2023", 8 pgs.

* cited by examiner

*Primary Examiner* — Sung H Pak
(74) *Attorney, Agent, or Firm* — Akona IP PC

(57) ABSTRACT

In an optical circuit, a substrate can define a cavity that extends into a substrate front surface. A sidewall of the cavity can include a substrate optical port. An optical path can extend through the substrate from a connector optical port to the substrate optical port. A photonic integrated circuit (PIC) can attach to the substrate. A PIC front surface can include a plurality of electrical connections. A PIC edge surface can extend around at least a portion of a perimeter of the PIC between the PIC front surface and a PIC back surface. A PIC optical port can be disposed on the PIC edge surface and can accept or emit an optical beam along a PIC optical axis. The PIC optical axis can be aligned with the substrate optical port when the PIC is attached to the substrate.

20 Claims, 7 Drawing Sheets

OPTICAL CIRCUIT WITH OPTICAL PORT IN SIDEWALL

TECHNICAL FIELD

Embodiments described herein generally relate to an optical circuit.

BACKGROUND

A photonic integrated circuit (PIC) can produce light or receive light. For example, a PIC can receive electrical power and can produce laser light at a specified wavelength in response to the received electrical power. The electrical power can optionally have a time-varying current or voltage, such as to encode a data signal onto the produced laser light. In another example, a PIC can receive light at a specified wavelength, can direct the received light onto a sensor, and can produce a current or voltage in response to the received light. The received light can optionally have a time-varying power level, such as corresponding to an encoded data signal on the received light, such that the PIC can produce a time-varying current or voltage that corresponds to the encoded data signal.

The PIC can operate within an optical circuit. For example, light can be coupled from the PIC into a fiber or can be coupled from a fiber into the PIC. Efficient coupling (e.g., coupling that includes an optical loss at or below a specified level) can involve relatively tight mechanical tolerances. For example, there may be relatively tight positional and/or angular tolerances on the PIC, on a fiber connector, and/or on any intervening optical elements between the PIC and the fiber connector.

There is ongoing effort to achieve efficient coupling between the PIC and the fiber. It is desired to have an optical circuit that addresses these concerns, and other technical challenges.

DESCRIPTION OF EMBODIMENTS

An optical circuit can include a photonic integrated circuit (PIC) attached to a substrate. The substrate can include an optical path that extends through the substrate, the optical path corresponding to a three-dimensional pathway over which the substrate can deliver light to or from the PIC. The substrate can direct an optical beam along the optical path to or from the PIC, such as to direct the optical beam to or from an optical connector (such as to or from an optical fiber). The substrate can optionally include optical elements formed integrally with the substrate, such as lenses, mirrors, and/or isolators. The optical elements can be formed along the optical path using wafer-level techniques, such as photolithography, so that the substrate can deliver or receive the optical beam at an optical port without performing individual alignment of any optical elements on each optical path. The PIC can attach to the substrate using alignment techniques that are precise enough so that the PIC can be placed passively and can operate on a wafer level. The PIC can attach to the substrate using surface tension self-alignment features to achieve alignment in a lateral plane (such as a plane generally parallel to a plane of the substrate) and using contact between a reference surface on the PIC and a reference surface of the substrate to achieve alignment in a direction orthogonal to the lateral plane. The self-alignment features may not be used for electrical connectivity between elements. The surface tension self-alignment features and the reference surfaces can typically achieve positional alignment in all three dimensions to within a fraction of a wavelength of light that is produced or received by the PIC. Such positional tolerances are typically sufficient to allow passive placement of the PIC with respect to the optical path in the substrate. Compared to an assembly technique in which the PIC is actively placed, such as by a robotically controlled pick-and-place machine, the surface tension self-alignment features and the reference surfaces can provide greater precision and can operate on a wafer level, which can provide an economy of scale and can result in cost savings over a pick-and-place technique or other alignment technique that addresses each optical circuit individually.

The above general description is intended merely to provide an overview of the detailed description that follows. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
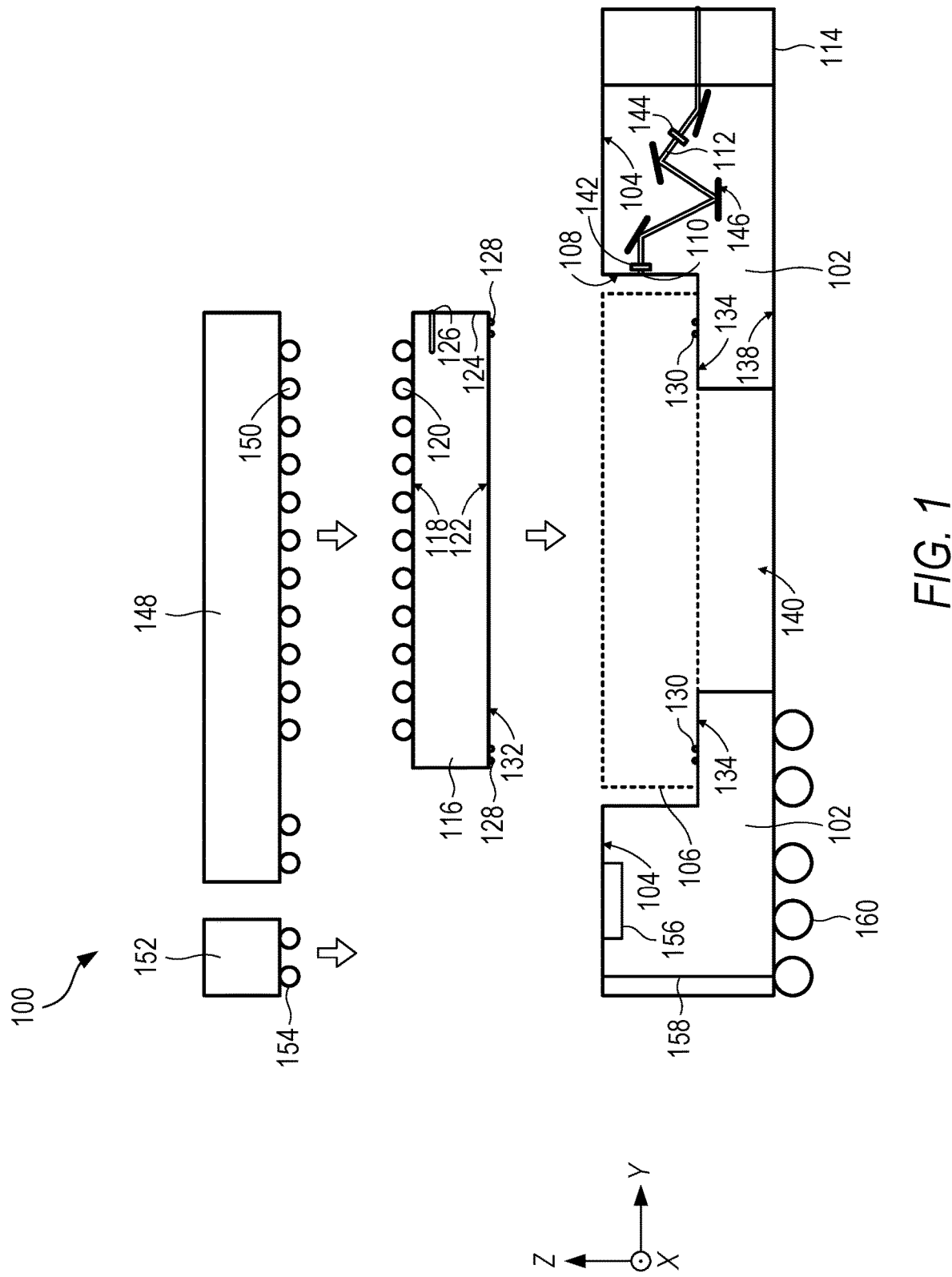
FIG. 1 shows a side view of an example of an optical circuit prior to assembly, in accordance with some embodiments.

FIG. 1 shows a side view of an example of an optical circuit 100 prior to assembly, in accordance with some embodiments. The optical circuit 100 can include a substrate 102, a photonic integrated circuit (PIC) 116 that is attachable to the substrate 102, and one or more optional integrated circuits 148, 152 that can electrically connect to electrical connections on the PIC 116 and/or electrical connections on the substrate 102. The substrate 102, the PIC 116, and the optional integrated circuits 148, 152 are shown in FIG. 1 as being separated from one another, prior to assembly of the completed optical circuit 100. The configuration of FIG. 1 is but one example of an optical circuit 100; other configurations can also be used.

The optical circuit 100 can include a substrate 102. In some examples, the substrate 102 can be formed from a rigid material, such as for providing mechanical support for circuitry chips and other elements of the optical circuit 100. In some examples, the substrate 102 can include one or more materials that are fully or at least partially transparent at one or more wavelengths. For example, the substrate 102 can be formed from silicon, glass, polycarbonate, or other suitable materials. In some examples, the substrate 102 can be formed from one or more materials that can be processed at a wafer level, such as by photolithography or other suitable techniques. Wafer-level processing techniques such as photolithography can allow placement of features on or within the substrate 102 with placement tolerances that can be significantly smaller than the wavelength. Further, the processing techniques can allow integration of additional optical components within or on the substrate 102, such as lenses, mirrors, and others. Examples of the additional optical components are discussed in detail below.

The substrate 102 can have a substrate front surface 104. In some examples, the substrate front surface 104 can be referred to as a substrate top surface. It will be understood that designations such as "front" and "top" are but convenient descriptors for particular sides of the substrate 102. For example, a substrate back surface may be located opposite the substrate front surface 104, and a substrate bottom surface may be located opposite the substrate top surface. These descriptors are included merely for convenience and ease in reference, and do not imply an absolute direction to any of the described elements.

The substrate 102 can define a cavity 106 that extends into the substrate front surface 104. In some examples, the PIC 116 can be placed inside the cavity 106 during assembly of the optical circuit 100. In some examples, the cavity 106 can be rectangular in cross-section, with the cross-section being taken in a plane that is parallel to the substrate front surface 104. In some examples, the cavity 106 can be shaped such that corners in the cross-section can include rounded portions. Other cavity shapes can also be used.

The cavity 106 can have at least one sidewall 108. In some examples, in which a perimeter of the cavity 106 is continuously curved (e.g., without sharp corners), the cavity 106 can include a single sidewall 108. In some examples, in which the perimeter of the cavity 106 includes at least one corner, the cavity 106 can include a plurality of sidewalls 108. The sidewalls 108 in the plurality can adjoin adjacent sidewalls 108 in the plurality at edges that extend from a top of the cavity 106 (e.g., at a plane of the front surface) toward a bottom of the cavity 106. For simplicity, the discussion that follows assumes that a single sidewall 108 is present, although it will be understood that multiple sidewalls 108 can also be used.

The sidewall 108 can include a substrate optical port 110. The substrate optical port 110 can align to a corresponding port on the PIC 116, so that when the optical circuit 100 is assembled, light can propagate between the substrate 102 and the PIC 116 with relatively high efficiency (e.g., with a coupling loss that is less than or equal to a loss threshold, such as 2 dB, 1 dB, 0.5 dB, 0.2 dB, 0.1 dB, or other suitable value).

The substrate 102 can include an optical path 112 that extends through the substrate 102 from a connector optical port 114 to the substrate optical port 110. In some examples, the optical path 112 can be formed as a volume within an elongated waveguide within the substrate 102. For example, such a waveguide can be formed as an air-filled passage (having a refractive index close to unity) extending within the material of the substrate 102, the material having a refractive index greater than that of the air-filled passage. As another example, the waveguide can be formed as a passage being filled with a solid material (such as glass) having a refractive index less than that of the substrate 102 (such as silicon). The waveguide can optionally include bends, such that the waveguide can extend to any specified volume within the substrate 102.

The optical path 112 can include interactions with one or more optical components that can be formed integrally with the substrate 102. Any or all of the optical components can be formed by techniques such as ion exchange, laser direct writing, etching, and others. For example, the substrate 102 can include a lens 142 integral with the substrate 102. In some examples, the lens 142 can collimate a beam emitted from the PIC 116 along the PIC optical axis when the PIC 116 is attached to the substrate 102. In some examples, the lens 142 can focus a beam directed toward the PIC 116 along the PIC optical axis when the PIC 116 is attached to the substrate 102. As another example, the substrate 102 can include an isolator 144 integral with the substrate 102. In some examples, when the PIC 116 is attached to the substrate 102, the isolator 144 can pass light that travels in a first direction along the optical path 112 and can block light that travels in a second direction opposite in the first direction along the optical path 112. As another example, the substrate 102 can include a mirror 146 integral with the substrate 102. The mirror 146 can reflect light along the optical path 112 within the substrate 102. Because the optical components can be formed integrally with the substrate 102 (e.g., such as by using semiconductor processes, such as photolithography), the optical components can be formed and located in high volumes (such as, as a wafer level) and can be formed and located with relatively high precision. For example, the location tolerances for photolithography-based features can be tighter than for comparable pick-and-place features. In other words, by forming the optical components at a wafer-level, the optical components can be manufactured more precisely and less costly than comparable components that are manufactured separately and are mechanically (e.g., robotically) placed. The lens, isolator, and mirror are but three examples of optical components that can be integral with the substrate 102; other suitable components can also be used.

The optical circuit 100 can include a photonic integrated circuit (PIC) 116 that is attachable to the substrate 102. In FIG. 1, the PIC 116 is shown as being separate from the substrate 102 and spaced apart from the substrate 102. During assembly of the optical circuit 100, the PIC 116 is placed into the cavity 106 in the substrate 102, the PIC 116 self-aligns to the substrate 102 (using a self-alignment technique discussed in detail below), and the PIC 116 is fastened in place with respect to the substrate 102. Because the self-alignment technique is relatively robust and provides alignment precision that is typically a fraction of the wavelength of light used by the PIC 116, the optical elements in the optical path 112 can be included with the substrate 102, so that the PIC 116 can lack additional optical elements. For example, the PIC 116 can lack a lens, an isolator, a mirror, and/or other optical elements.

The PIC 116 can have a PIC front surface 118 that includes a plurality of electrical connections 120. When the PIC 116 is positioned in the cavity 106, the PIC front surface 118 can be roughly coplanar with the substrate front surface 104. Such rough coplanarity can be sufficient for establishing electrical connections 120 but may optionally be less precise than the alignment required for the optical path 112.

The PIC 116 can have a PIC back surface 122, opposite the PIC front surface 118. The PIC back surface 122 can optionally lack electrical connections. The PIC back surface 122 can be used to help dissipate heat generated by the PIC 116 (described below with regard to FIG. 2).

The PIC 116 can have a PIC edge surface 124 that extends around at least a portion of a perimeter of the PIC 116 between the PIC front surface 118 and the PIC back surface 122. In FIG. 1, the PIC edge surface 124 is shown as being orthogonal to the PIC front surface 118 and/or orthogonal to the PIC back surface 122. The PIC edge surface 124 can alternatively include one or more inclined portions, curved portions, steps, and/or ridges. In a specific example, the perimeter of the PIC 116 can be rectangular or substantially rectangular, and PIC edge surface 124 can include four portions that each extend along a respective side of the rectangle. Other configurations can also be used.

The PIC 116 can have a PIC optical port 126 disposed on the PIC edge surface 124. The PIC optical port 126 can accept or emit an optical beam along a PIC optical axis. The PIC optical axis can be aligned with the substrate optical port 110 when the PIC 116 is attached to the substrate 102. The optical beam can be collimated, diverging, or converging as it passes through the PIC optical port 126. The PIC optical port 126 can be formed using wafer-level techniques, such as photolithography, such that the location of the PIC optical port 126 can be controlled relatively precisely with respect to the self-alignment features, discussed below.

The PIC back surface 122 can include a first plurality of surface tension self-alignment features 128. The bottom of the cavity 106 can include a second plurality of surface tension self-alignment features 130 having locations that correspond to the first plurality of surface tension self-alignment features 128. The first plurality of surface tension self-alignment features 128 can self-align via surface tension to the second plurality of surface tension self-alignment features 130 when the first plurality of surface tension self-alignment features 128 is placed in contact with the second plurality of surface tension self-alignment features 130. The first plurality of surface tension self-alignment features 128 and the second plurality of surface tension self-alignment features 130 may not be used for electrical connectivity between the PIC 116 and the substrate 102.

The first plurality of surface tension self-alignment features 128 and the second plurality of surface tension self-alignment features 130 can be in a liquid state under a specified physical condition. For example, some or all of the surface tension self-alignment features can be delivered in a solid state, then heated to melt the surface tension self-alignment features. As another example, some or all of the surface tension self-alignment features can be delivered in a liquid state, to remain in the liquid state during self-alignment. As still another example, some or all of the surface tension self-alignment features can be delivered in a liquid state, cooled to a solid state, and melted to return to the liquid state during self-alignment.

The first plurality of surface tension self-alignment features 128 can self-align via surface tension to the second plurality of surface tension self-alignment features 130 when the first plurality of surface tension self-alignment features 128 and the second plurality of surface tension self-alignment features 130 are in the liquid state. The first plurality of surface tension self-alignment features 128 and the second plurality of surface tension self-alignment features 130 can align the PIC 116 to the substrate 102 in a plane that is parallel to the substrate reference surface (described below), such as the X-Y plane shown in FIGS. 1-8. Such self-alignment is discussed in greater detail below with respect to FIGS. 4-6.

The PIC 116 can include a PIC reference surface 132 that lacks surface tension self-alignment features. In some examples, the PIC reference surface 132 can include an area of the PIC back surface 122 that lacks surface tension self-alignment features. In some examples, the PIC reference surface 132 can be separate from the PIC back surface 122. In some examples, the PIC reference surface 132 can extend around at least a portion of a perimeter of the PIC 116. The PIC reference surface 132 can be formed using wafer-level techniques, such as photolithography, such that the location of the PIC reference surface 132 can be controlled relatively precisely with respect to the PIC optical port 126 and the surface tension self-alignment features, discussed below.

The substrate 102 can include a substrate reference surface 134 that lacks surface tension self-alignment features. In some examples, the substrate reference surface 134 can include a portion of a bottom of the cavity 106. In some examples, the substrate reference surface 134 can include a ledge or a ridge that extends around a perimeter of a bottom of the cavity 106. The substrate reference surface 134 can be formed using wafer-level techniques, such as photolithography, such that the location of the substrate reference surface 134 can be controlled relatively precisely with respect to the substrate optical port 110 and the self-alignment features, discussed below.

The PIC reference surface 132 can contact the substrate reference surface 134 to align the PIC 116 to the substrate 102 along a direction that is orthogonal to the substrate reference surface 134, such as the Z-direction shown in FIG. 1-8. When this Z-alignment is combined with the X-Y alignment provided by the surface tension self-aligning features, the PIC 116 can be aligned in three dimensions (e.g., X, Y, and Z) to within a fraction of a wavelength of light used by the PIC 116. Such alignment can be precise enough to passively position the PIC optical port 126 with respect to the substrate optical port 110, without using additional alignment for each device to improve the coupling efficiency between the PIC 116 and the substrate 102.

Figure 2:
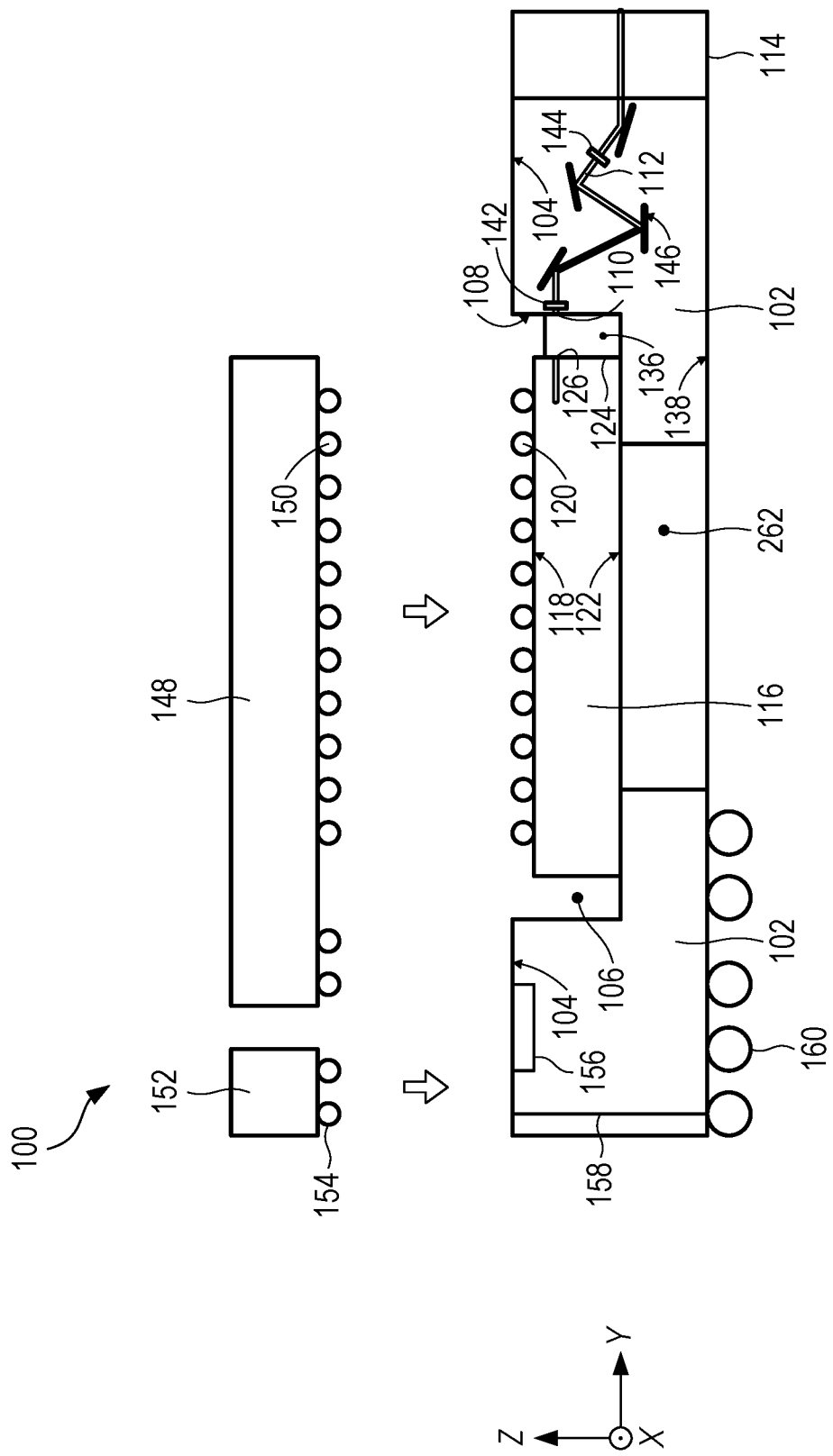
FIG. 2 shows a side view of an example of the optical circuit of FIG. 1, after the PIC has been attached to the substrate, in accordance with some embodiments.

FIG. 2 shows a side view of an example of the optical circuit 100 of FIG. 1, after the PIC 116 has been attached to the substrate 102, in accordance with some embodiments.

As described above, the PIC 116 and the substrate 102 have achieved alignment in the X-Y plane via the surface tension self-alignment features 128, 130. The PIC 116 and the substrate 102 have achieved alignment in the X-direction via the contacting reference surfaces 132, 134. The surface tension self-alignment features 128, 130 and the contacting reference surfaces 132, 134 can perform their alignments with enough precision such that no additional (e.g., unit-by-unit) adjustment of position may be needed to achieve sufficiently low loss (e.g., below a specified loss threshold) in the coupling of light between the PIC 116 and the substrate 102.

To further reduce loss in the coupling of light between the PIC 116 and the substrate 102, an index-matching material 136 can be disposed between the PIC edge surface 124 and the at least one sidewall 108 of the cavity 106. The index-matching material 136 can reduce reflections and/or scattering at an interface between the PIC 116 and the substrate 102. The index-matching material 136 can optionally have a refractive index that lies between a refractive index of a core of the light guide along the optical path 112 in the substrate 102 and a refractive index of a core of the light guide in the PIC 116, inclusively. In some examples, the index-matching material 136 can be injected as a liquid in the cavity 106, in the volume between the PIC 116 and the sidewall 108. In some examples, the index-matching material 136 can be deposited at the interface between the contacting reference surfaces 132, 134, such that capillary action can move the contacting reference surfaces 132, 134 to a portion of the cavity 106 between the PIC edge surface 124 and the at least one sidewall 108 of the cavity 106. In some examples, the index-matching material 136 can be cured, such as by ultraviolet light, to change the index-matching material 136 from a liquid to a solid. Other configurations can also be used.

Because the PIC back surface 122 can be accessible to the substrate 102, the optical circuit 100 can use the PIC back surface 122 to help dissipate heat from the PIC 116. For example, the substrate 102 can include a substrate back surface 138 opposite the substrate front surface 104. The substrate 102 can include at least one aperture 140 extending from the substrate back surface 138 to the bottom of the cavity 106. In some examples, the at least one aperture 140 can include a central aperture that includes a central portion of the bottom of the cavity 106. At least one thermal connection 262 (such as a wire or at least a portion of a metal heat sink) can be disposed in and can extend through the at least one aperture 140. The at least one thermal connection 262 can include at least one material (such as a metal) having a greater thermal conductivity than a thermal conductivity of the substrate 102. The at least one thermal connection 262 can thermally contact the PIC back surface 122 and can direct heat away from the PIC 116.

Figure 3:
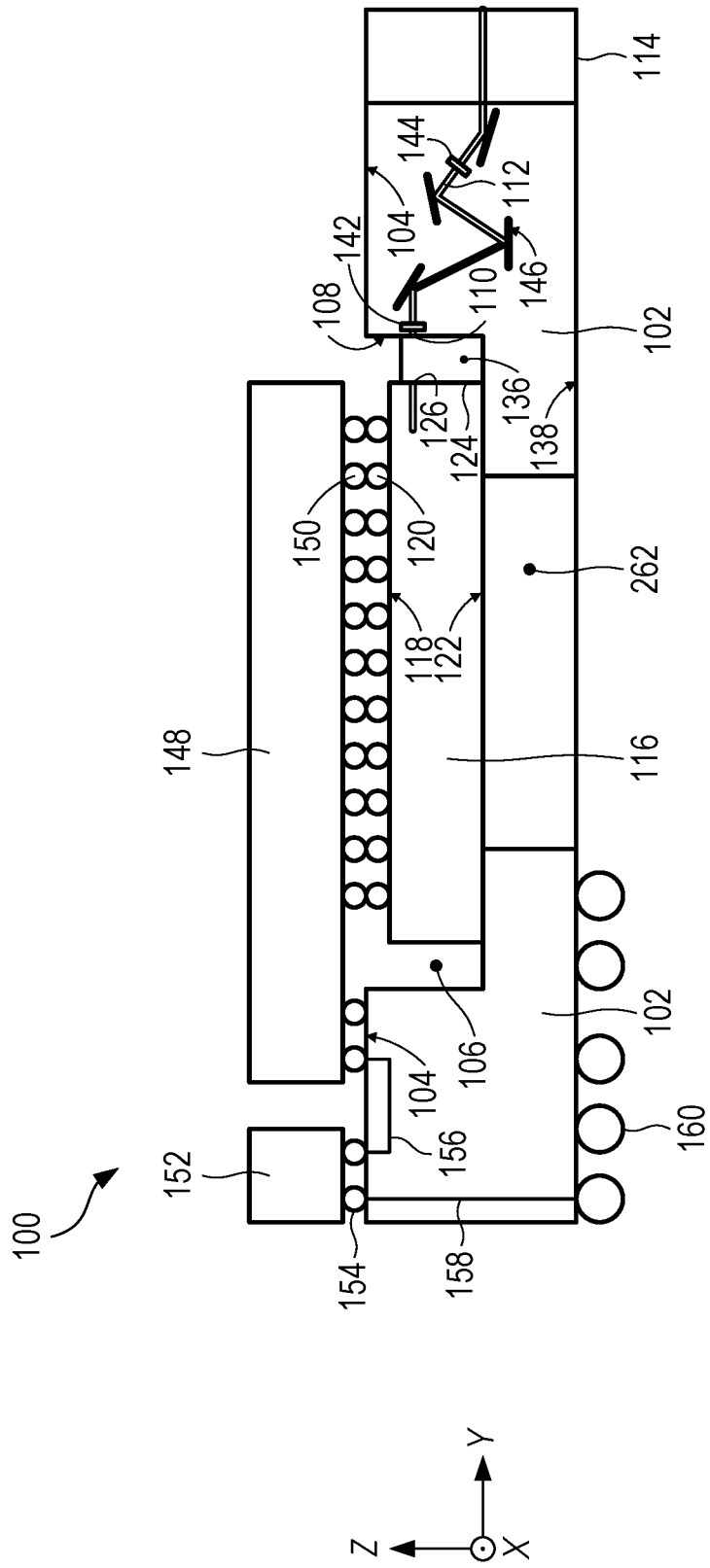
FIG. 3 shows a side view of an example of the optical circuit of FIGS. 1 and 2, after at least one integrated circuit has electrically connected to the plurality of electrical connections on the PIC, in accordance with some embodiments.

FIG. 3 shows a side view of an example of the optical circuit 100 of FIGS. 1 and 2, after at least one integrated circuit has electrically connected to the plurality of electrical connections 120 on the PIC 116, in accordance with some embodiments.

An integrated circuit 148 has electrical connections 150 that can electrically connect to the plurality of electrical connections 120 on the PIC 116 and electrically connect to a second plurality of electrical connections (not shown) on the substrate front surface 104. The electrical connections 120 can include balls or volumes of solder that are placed on each chip. The solder volumes are either liquid or are liquified by heating or another liquifying technique. When in liquid form, the solder volumes form their electrical connections between the chips. The solder volumes can then be solidified by allowing the solder volumes to cool or another solidifying technique.

In the example of FIG. 3, a second integrated circuit 152 has electrical connections 154 that can electrically connect to the substrate 102. The second integrated circuit 152 can optionally connect to the integrated circuit 148 via one or more electrical connections 156 that extend in the substrate 102 proximate the substrate front surface 104. The second integrated circuit 152 can optionally connect via one or more electrical connections 158 to one or more electrical connections 160 on the substrate back surface 138. The electrical connections 160 on the substrate back surface 138 can optionally be formed with a different pitch (e.g., spacing) and/or a different volume of the solder ball, such as a larger pitch and a larger solder ball volume, compared with electrical connections (not shown) on the substrate front surface 104. Such a larger size and spacing can allow a less precise (and therefore less expensive) machine to position the substrate 102 as needed.

In the examples shown in FIGS. 1-3, the PIC 116 can interface directly with the substrate 102. For example, the substrate 102 can be a package substrate, such as polymer package substrate. As an alternative to any or all of these examples, an interposer can be disposed between the PIC 116 and the substrate 102. The interposer can include some or all of the electrical connections shown in the substrate 102 of FIGS. 1-3, and can attach to a substrate as needed. For the purposes of this document, the term substrate can include a package substrate, and can optionally include an interposer disposed between the package substrate and the PIC 116.

Figure 4:
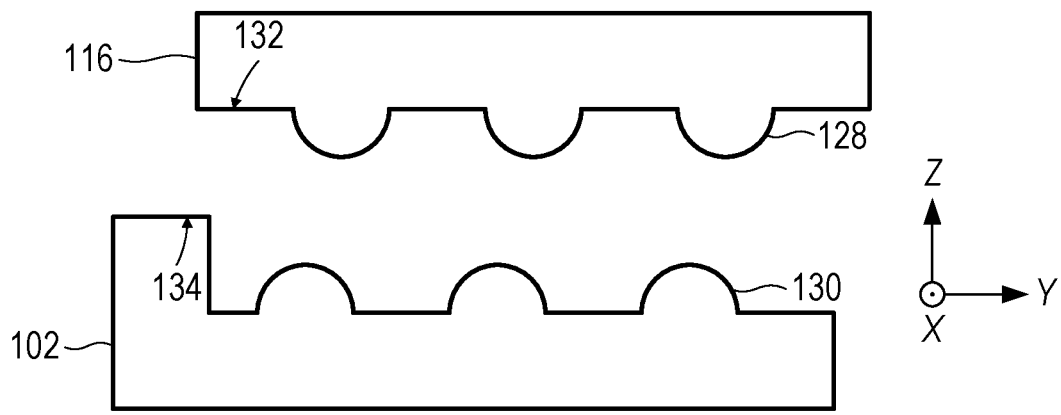
FIG. 4 shows a side view of a portion of the PIC and a portion of the substrate, before the PIC has been mechanically positioned with respect to the substrate, in accordance with some embodiments.
Figure 5:
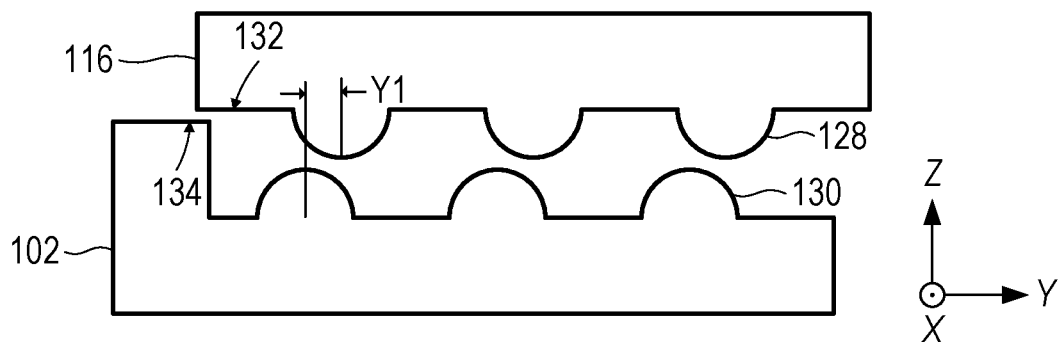
FIG. 5 shows a side view of a portion of the PIC and a portion of the substrate, after the PIC has been mechanically positioned with respect to the substrate, in accordance with some embodiments.
Figure 6:
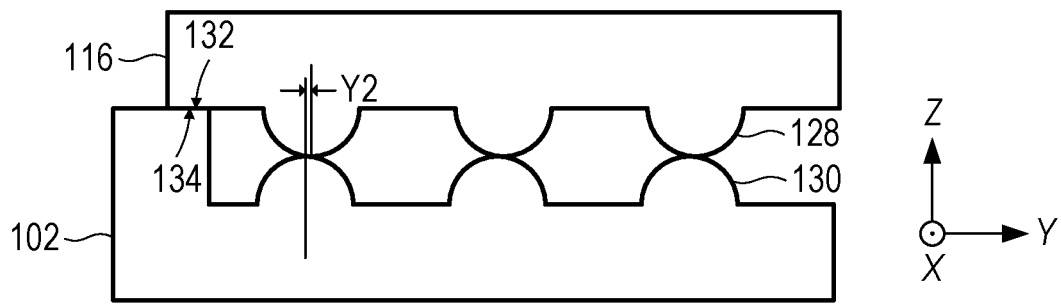
FIG. 6 shows a side view of a portion of the PIC and a portion of the substrate, after the PIC has self-aligned to the substrate in three dimensions, in accordance with some embodiments.

FIGS. 4-6 show a portion of the PIC 116 and a corresponding portion of the substrate 102 in various stages of alignment during assembly of the optical circuit 100.

FIG. 4 shows a side view of a portion of the PIC 116 and a portion of the substrate 102, before the PIC 116 has been mechanically positioned with respect to the substrate 102, in accordance with some embodiments.

The PIC 116 includes the PIC reference surface 132 and the first plurality of surface tension self-alignment features 128. The substrate 102 includes the substrate reference surface 134 and the second plurality of surface tension self-alignment features 130.

FIG. 5 shows a side view of a portion of the PIC 116 and a portion of the substrate 102, after the PIC 116 has been mechanically positioned with respect to the substrate 102, in accordance with some embodiments.

The mechanical positioning can be performed by a pick-and-place assembling device or other suitable positioning device. The first plurality of surface tension self-alignment features 128 is misaligned with the second plurality of surface tension self-alignment features 130 by a distance Y1. The distance Y1 can be less than a diameter of the surface tension self-alignment features, so that each surface tension self-alignment feature in the first plurality can contact a corresponding surface tension self-alignment feature in the second plurality. In most cases, the distance Y1 can be too large to achieve a sufficient coupling efficiency between the PIC 116 and the substrate 102.

FIG. 6 shows a side view of a portion of the PIC 116 and a portion of the substrate 102, after the PIC 116 has self-aligned to the substrate 102 in three dimensions (e.g., X, Y, and Z), in accordance with some embodiments.

The first plurality of surface tension self-alignment features 128 has self-aligned to the second plurality of surface tension self-alignment features 130 to achieve alignment in the X-Y plane. After self-alignment in X-Y, the first plurality of surface tension self-alignment features 128 is misaligned with the second plurality of surface tension self-alignment features 130 by a distance Y2, which can be less than distance Y1. After self-alignment in Z, the PIC reference surface 132 is in contact with the substrate reference surface 134. After the self-alignment, typical misalignments in X, Y, and Z can be less than 1 μm, and as small as 0.1 μm or smaller.

Figure 7:
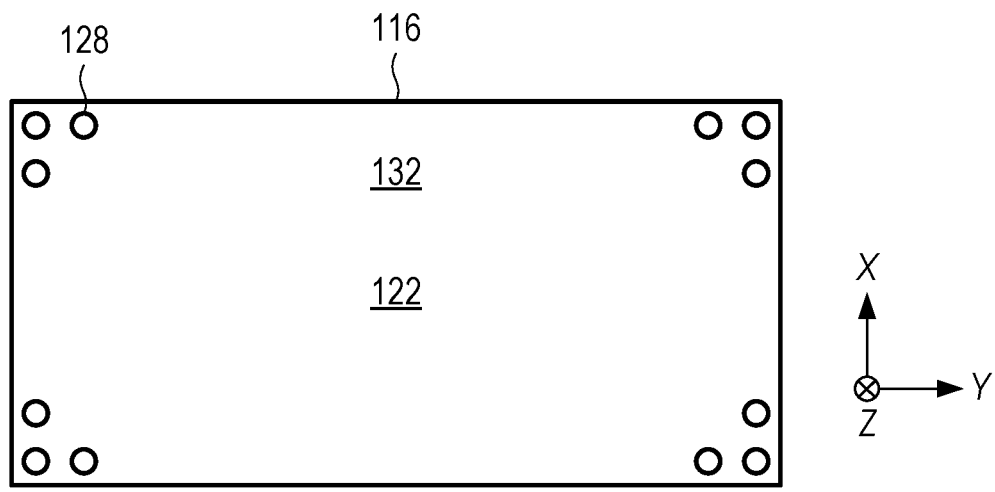
FIG. 7 shows a bottom view of an example of a PIC back surface, in accordance with some embodiments.
Figure 8:
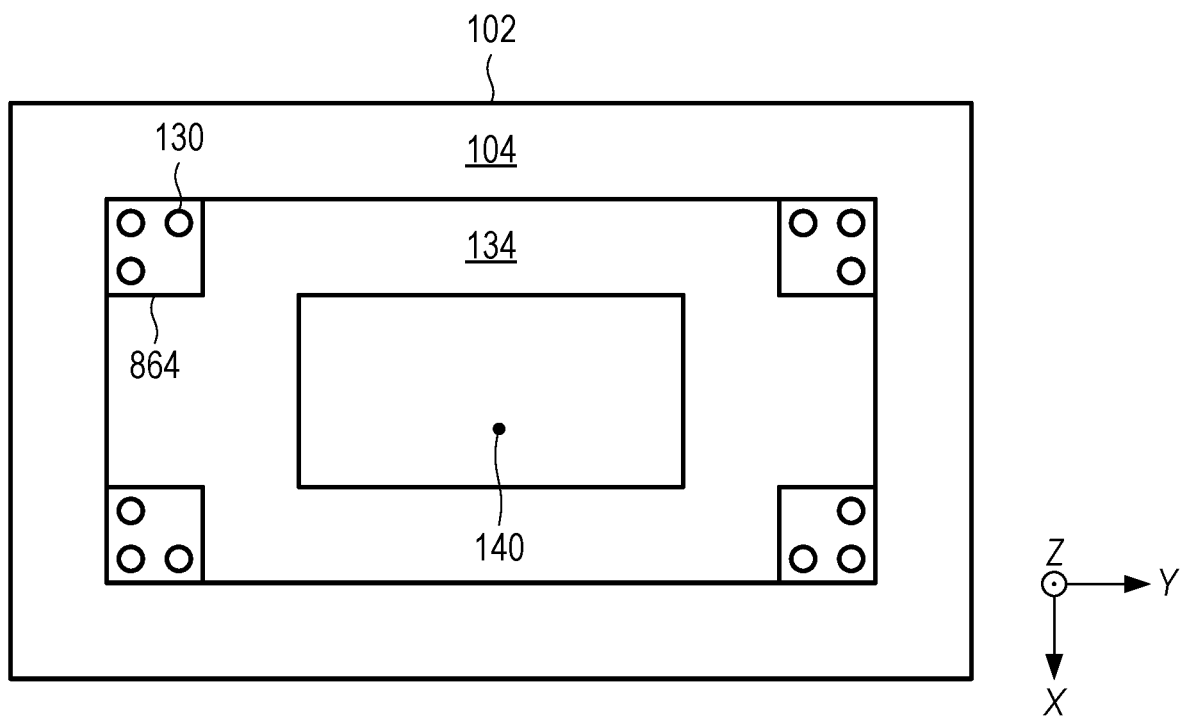
FIG. 8 shows a top view of an example of a substrate front surface, in accordance with some embodiments.

FIGS. 7 and 8 show an example of a placement scheme for the surface tension self-alignment features.

FIG. 7 shows a bottom view of an example of a PIC back surface 122, in accordance with some embodiments.

In some examples, the PIC 116 can have a polygonal, square, or rectangular footprint. The PIC back surface 122 can include PIC back surface corners. The first plurality of surface tension self-alignment features 128 can be located in a periphery of the PIC back surface 122 proximate the PIC back surface corners.

By positioning the first plurality of surface tension self-alignment features 128 at or near the corners of the PIC back surface 122, the optical circuit 100 can achieve extremely tight tolerancing with respect to angle in the X-Y plane (e.g., with respect to rotation about the Z-axis). For example, if the positional misalignment of a self-alignment feature is 1 μm, and the PIC back surface 122 is 5 mm square, then an angular misalignment (about Z) can be about 0.01 degrees (or about 0.2 milliradians). If the positional misalignment is 0.1 μm, and the PIC back surface 122 is 5 mm square, then an angular misalignment (about Z) can be about 1 millidegree (or about 20 microradians).

FIG. 8 shows a top view of an example of a substrate front surface 104, in accordance with some embodiments.

In some examples, the cavity 106 can include cavity corners. The second plurality of surface tension self-alignment features 130 can be located in a periphery of the cavity 106 proximate the cavity corners. During alignment, the PIC 116 can be placed with respect to the substrate 102 such that such that the first plurality of surface tension self-alignment features 128 contacts the second plurality of surface tension self-alignment features 130.

In some examples, the bottom of the cavity 106 can optionally include recessed areas 864 around the second plurality of surface tension self-alignment features 130. Such recessed areas 864 can help provide clearance around the reference surfaces 132, 134, so that the height (e.g., extent in the Z-direction) of the surface tension self-alignment features does not interfere with contact between the reference surfaces 132, 134. In some examples, each corner of the cavity 106 can have a corresponding recessed area 864 that surrounds the corresponding self-alignment features 130. In some examples, the PIC back surface 122 can optionally include recessed areas that can surround the surface tension self-alignment features to help avoid interference between the reference surfaces 132, 134.

The bottom of the cavity 106 can include a first area. The substrate 102 can include a substrate back surface 138 opposite the substrate front surface 104. The substrate 102 can include at least one aperture 140 extending from the substrate back surface 138 to the first area of the bottom of the cavity 106. In some examples, the at least one aperture 140 can be a single aperture, such as in a central portion of the bottom of the cavity 106. At least one thermal connection can be disposed in and can extend through the at least one aperture. The at least one thermal connection can include at least one material having a greater thermal conductivity than a thermal conductivity of the substrate 102. The at least one thermal connection can thermally contact the PIC back surface 122 and can help dissipate heat generated by the PIC 116.

Figure 9:
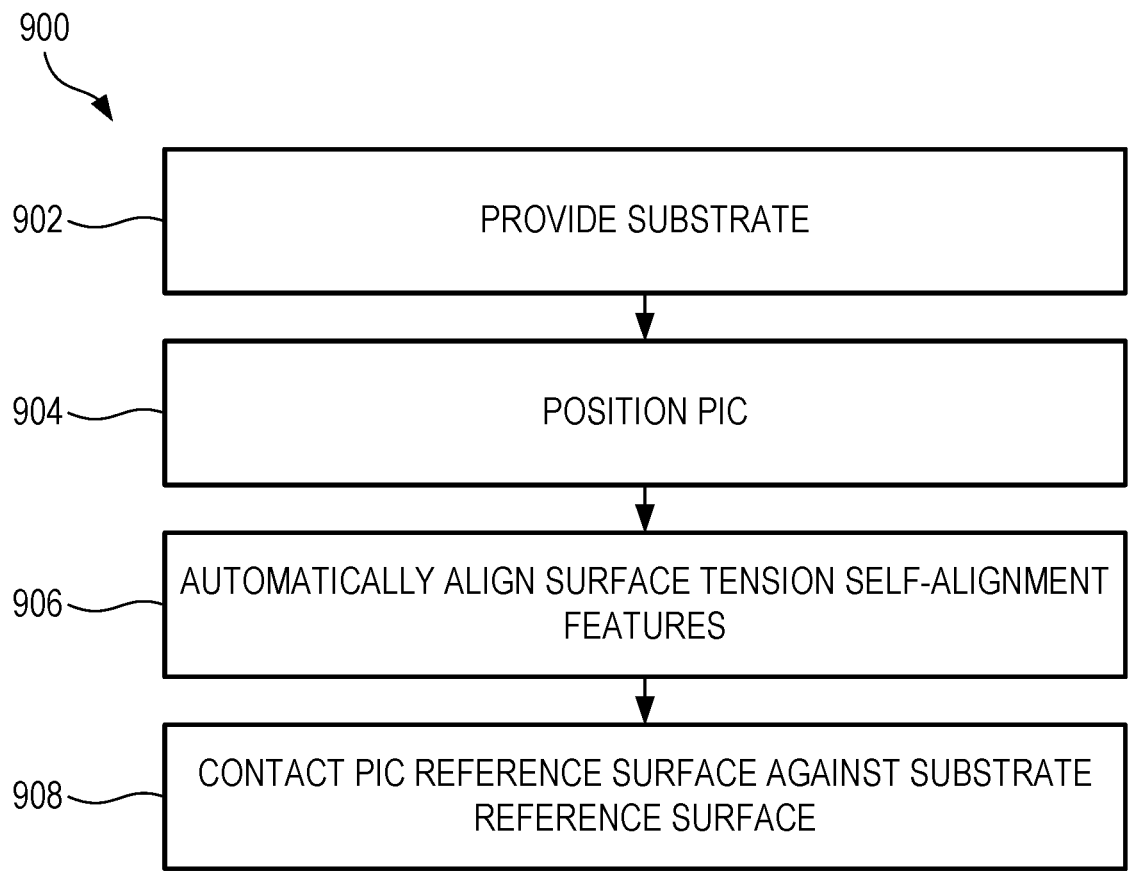
FIG. 9 shows a flow chart of an example of a method for assembling an optical circuit, in accordance with some embodiments.

FIG. 9 shows a flow chart of an example of a method 900 for assembling an optical circuit, in accordance with some embodiments. The method 900 can be executed to assemble the optical circuit 100 shown in FIGS. 1-3, or to assemble other suitable optical circuits. Other methods of assembly can also be used.

At operation 902, a substrate can be provided. The substrate can have a substrate front surface. The substrate can define a cavity that extends into the substrate front surface. The cavity can have at least one sidewall that extends toward a bottom of the cavity. The bottom of the cavity can include a first plurality of surface tension self-alignment features. The cavity can include a substrate reference surface that lacks surface tension self-alignment features.

At operation 904, a photonic integrated circuit (PIC) can be positioned within the cavity. The PIC can have a PIC front surface that includes a plurality of electrical connections. The PIC can have a PIC back surface. The PIC can have a second plurality of surface tension self-alignment features located on the PIC back surface. The PIC can have a PIC reference surface that lacks surface tension self-alignment features.

At operation 906, the second plurality of surface tension self-alignment features can be automatically aligned to the first plurality of surface tension self-alignment features, via surface tension in the first and second pluralities of the surface tension self-alignment features, to align the PIC to the substrate in a plane that is parallel to the substrate reference surface.

At operation 908, the PIC reference surface can contact against the substrate reference surface to align the PIC to the substrate in a direction that is orthogonal to the substrate reference surface, such that when the PIC is aligned to the substrate in the plane that is parallel to the substrate reference surface and in the direction that is orthogonal to the substrate reference surface, a PIC optical port disposed on the PIC is aligned to a substrate optical port disposed on the substrate.

Figure 10:
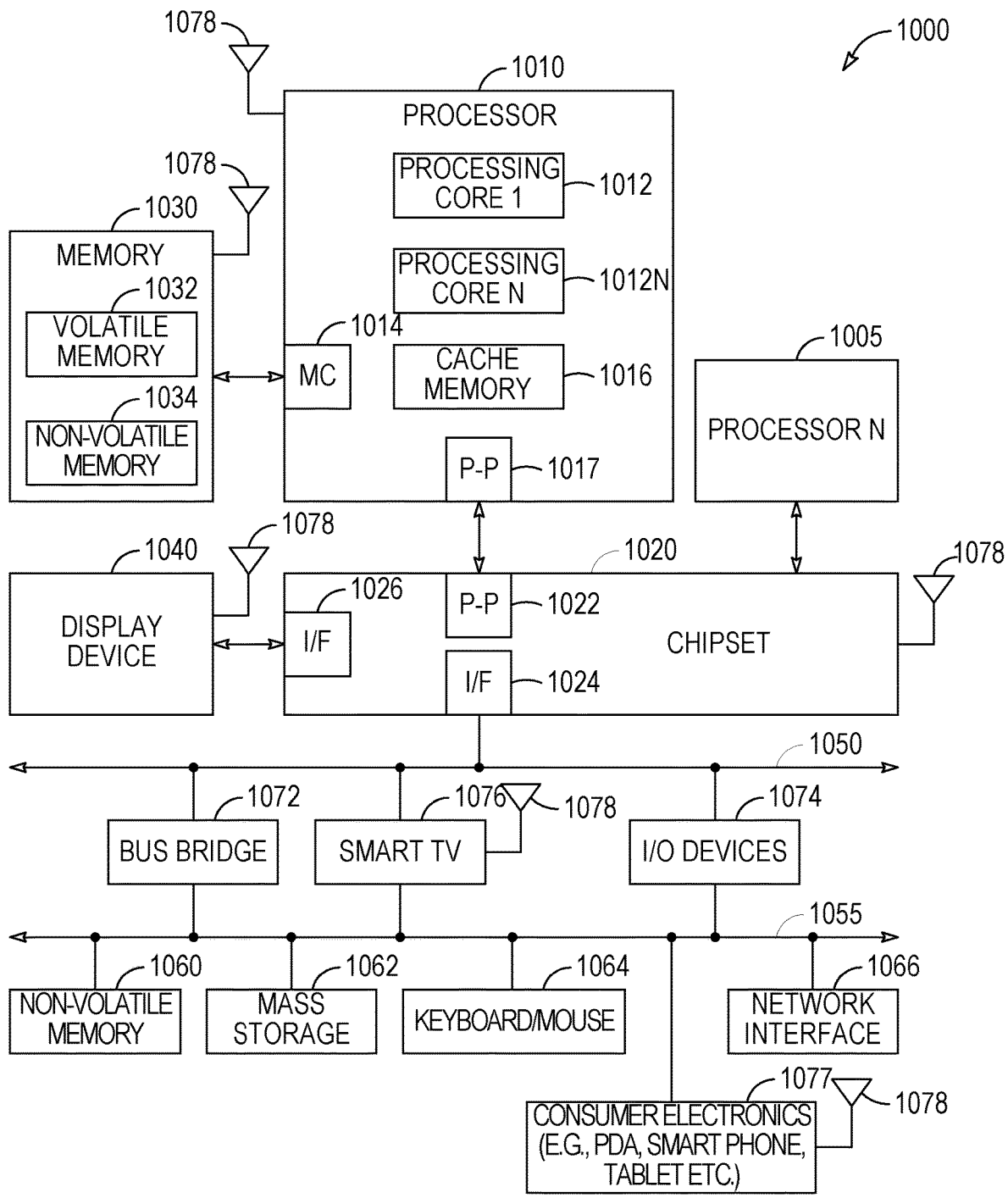
FIG. 10 shows a system level diagram, depicting an example of an electronic device (e.g., system) that may include an optical circuit and/or methods described above.

FIG. 10 shows a system level diagram, depicting an example of an electronic device (e.g., system) that may include an optical circuit (such as 100) and/or methods described above. In one embodiment, system 1000 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 1000 includes a system on a chip (SOC) system.

In one embodiment, processor 1010 has one or more processor cores 1012 and 1012N, where 1012N represents the Nth processor core inside processor 1010 where N is a positive integer. In one embodiment, system 1000 includes multiple processors including 1010 and 1005, where processor 1005 has logic similar or identical to the logic of processor 1010. In some embodiments, processing core 1012 includes, but is not limited to, pre-fetch logic to fetch instructions, decode logic to decode the instructions, execution logic to execute instructions and the like. In some embodiments, processor 1010 has a cache memory 1016 to cache instructions and/or data for system 1000. Cache memory 1016 may be organized into a hierarchal structure including one or more levels of cache memory.

In some embodiments, processor 1010 includes a memory controller 1014, which is operable to perform functions that enable the processor 1010 to access and communicate with memory 1030 that includes a volatile memory 1032 and/or a non-volatile memory 1034. In some embodiments, processor 1010 is coupled with memory 1030 and chipset 1020. Processor 1010 may also be coupled to a wireless antenna 1078 to communicate with any device configured to transmit and/or receive wireless signals. In one embodiment, an interface for wireless antenna 1078 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 1032 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1034 includes, but is not limited to, flash memory, phase change memory (PCM), read-only memory (ROM), electrically erasable programmable read-only memory (EEPROM), or any other type of non-volatile memory device.

Memory 1030 stores information and instructions to be executed by processor 1010. In one embodiment, memory 1030 may also store temporary variables or other intermediate information while processor 1010 is executing instructions. In the illustrated embodiment, chipset 1020 connects with processor 1010 via Point-to-Point (PtP or P-P) interfaces 1017 and 1022. Chipset 1020 enables processor 1010 to connect to other elements in system 1000. In some embodiments of the example system, interfaces 1017 and 1022 operate in accordance with a PtP communication protocol such as the Intel® QuickPath Interconnect (QPI) or the like. In other embodiments, a different interconnect may be used.

In some embodiments, chipset 1020 is operable to communicate with processor 1010, 1005N, display device 1040, and other devices, including a bus bridge 1072, a smart TV 1076, I/O devices 1074, nonvolatile memory 1060, a storage medium (such as one or more mass storage devices) 1062, a keyboard/mouse 1064, a network interface 1066, and various forms of consumer electronics 1077 (such as a PDA, smart phone, tablet etc.), etc. In one embodiment, chipset 1020 couples with these devices through an interface 1024. Chipset 1020 may also be coupled to a wireless antenna 1078 to communicate with any device configured to transmit and/or receive wireless signals. In one example, any combination of components in a chipset may be separated by a continuous flexible shield as described in the present disclosure.

Chipset 1020 connects to display device 1040 via interface 1026. Display 1040 may be, for example, a liquid crystal display (LCD), a light emitting diode (LED) array, an organic light emitting diode (OLED) array, or any other form of visual display device. In some embodiments of the example system, processor 1010 and chipset 1020 are merged into a single SOC. In addition, chipset 1020 connects to one or more buses 1050 and 1055 that interconnect various system elements, such as I/O devices 1074, non-volatile memory 1060, storage medium 1062, a keyboard/mouse 1064, and network interface 1066. Buses 1050 and 1055 may be interconnected together via a bus bridge 1072.

In one embodiment, mass storage device 1062 includes, but is not limited to, a solid-state drive, a hard disk drive, a universal serial bus flash memory drive, or any other form of computer data storage medium. In one embodiment, network interface 1066 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 10 are depicted as separate blocks within the system 1000, the functions performed by some of these blocks may be integrated within a single semiconductor circuit or may be implemented using two or more separate integrated circuits. For example, although cache memory 1016 is depicted as a separate block within processor 1010, cache memory 1016 (or selected aspects of 1016) can be incorporated into processor core 1012.

To better illustrate the method and apparatuses disclosed herein, a non-limiting list of embodiments is provided here:

Example 1 includes an optical circuit that can include: a substrate having a substrate front surface, the substrate defining a cavity that extends into the substrate front surface, the cavity having at least one sidewall, the sidewall including a substrate optical port, the substrate including an optical path that extends through the substrate from a connector optical port to the substrate optical port; and a photonic integrated circuit (PIC) attachable to the substrate, the PIC having a PIC front surface that includes a plurality of electrical connections, the PIC having a PIC back surface, the PIC having a PIC edge surface that extends around at least a portion of a perimeter of the PIC between the PIC front surface and the PIC back surface, the PIC having a PIC optical port disposed on the PIC edge surface and configured to accept or emit an optical beam along a PIC optical axis, the PIC optical axis being aligned with the substrate optical port when the PIC is attached to the substrate.

Example 2 can include the optical circuit of Example 1, wherein: the PIC back surface includes a first plurality of surface tension self-alignment features; the bottom of the cavity includes a second plurality of surface tension self-alignment features having locations that correspond to the first plurality of surface tension self-alignment features; and the first plurality of surface tension self-alignment features is configured to self-align via surface tension to the second plurality of surface tension self-alignment features when the first plurality of surface tension self-alignment features is placed in contact with the second plurality of surface tension self-alignment features.

Example 3 can include the optical circuit of any one of Examples 1-2, wherein: the first plurality of surface tension self-alignment features and the second plurality of surface tension self-alignment features are configured to be in a liquid state under a specified physical condition; and the first plurality of surface tension self-alignment features is configured to self-align via surface tension to the second plurality of surface tension self-alignment features when the first plurality of surface tension self-alignment features and the second plurality of surface tension self-alignment features are in the liquid state.

Example 4 can include the optical circuit of any one of Examples 1-3, wherein: the PIC includes a PIC reference surface that lacks surface tension self-alignment features; the substrate includes a substrate reference surface that lacks surface tension self-alignment features; and the PIC reference surface is configured to contact the substrate reference surface to align the PIC to the substrate along a direction that is orthogonal to the substrate reference surface.

Example 5 can include the optical circuit of any one of Examples 1-4, wherein the PIC reference surface comprises an area of the PIC back surface that lacks surface tension self-alignment features.

Example 6 can include the optical circuit of any one of Examples 1-5, wherein the first plurality of surface tension self-alignment features and the second plurality of surface tension self-alignment features are configured to align the PIC to the substrate in a plane that is parallel to the substrate reference surface.

Example 7 can include the optical circuit of any one of Examples 1-6, wherein: the PIC back surface includes PIC back surface corners; the first plurality of surface tension self-alignment features are located in a periphery of the PIC back surface proximate the PIC back surface corners; the cavity includes cavity corners; and the second plurality of surface tension self-alignment features are located in a periphery of the cavity proximate the cavity corners.

Example 8 can include the optical circuit of any one of Examples 1-7, wherein: the bottom of the cavity includes a first area; the substrate includes a substrate back surface opposite the substrate front surface; and the substrate includes at least one aperture extending from the substrate back surface to the first area of the bottom of the cavity.

Example 9 can include the optical circuit of any one of Examples 1-8, further comprising at least one thermal connection disposed in and extending through the at least one aperture, the at least one thermal connection comprising at least one material having a greater thermal conductivity than a thermal conductivity of the substrate.

Example 10 can include the optical circuit of any one of Examples 1-9, wherein the substrate includes a lens integral with the substrate, the lens configured to collimate a beam emitted from the PIC along the PIC optical axis when the PIC is attached to the substrate or focus a beam directed toward the PIC along the PIC optical axis when the PIC is attached to the substrate.

Example 11 can include the optical circuit of any one of Examples 1-10, wherein the substrate includes an isolator integral with the substrate, the isolator configured such that when the PIC is attached to the substrate, the isolator passes light that travels in a first direction along the optical path and blocks light that travels in a second direction opposite in the first direction along the optical path.

Example 12 can include the optical circuit of any one of Examples 1-11, wherein the substrate includes a mirror integral with the substrate, the mirror configured to reflect light along the optical path within the substrate.

Example 13 can include the optical circuit of any one of Examples 1-12, wherein the PIC lacks a lens, an isolator, and a mirror.

Example 14 can include the optical circuit of any one of Examples 1-13, further comprising an integrated circuit configured to electrically connect to the plurality of electrical connections on the PIC and electrically connect to a second plurality of electrical connections on the front surface of the substrate.

Example 15 can include the optical circuit of any one of Examples 1-14, further comprising an index-matching material disposed between the PIC edge surface and the at least one sidewall of the cavity, the index-matching material configured to reduce reflections at an interface between the PIC and the substrate.

Example 16 can include the optical circuit of any one of Examples 1-15, wherein the PIC back surface lacks electrical connections.

Example 17 can include a method for assembling an optical circuit. The method can include: providing a substrate, the substrate having a substrate front surface and defining a cavity that extends into the substrate front surface, the cavity having at least one sidewall that extends toward a bottom of the cavity, the bottom of the cavity including a first plurality of surface tension self-alignment features, the cavity including a substrate reference surface that lacks surface tension self-alignment features; positioning a photonic integrated circuit (PIC) within the cavity, the PIC having a PIC front surface that includes a plurality of electrical connections, a PIC back surface, a second plurality of surface tension self-alignment features located on the PIC back surface, and a PIC reference surface that lacks surface tension self-alignment features; automatically aligning the second plurality of surface tension self-alignment features to the first plurality of surface tension self-alignment features, via surface tension in the first and second pluralities of the surface tension self-alignment features, to align the PIC to the substrate in a plane that is parallel to the substrate reference surface; and contacting the PIC reference surface against the substrate reference surface to align the PIC to the substrate in a direction that is orthogonal to the substrate reference surface, such that when the PIC is aligned to the substrate in the plane that is parallel to the substrate reference surface and in the direction that is orthogonal to the substrate reference surface, a PIC optical port disposed on the PIC is aligned to a substrate optical port disposed on the substrate.

Example 18 can include the method of Example 17, further comprising: positioning a refractive index-matching material between the PIC edge surface and the at least one sidewall of the cavity to reduce reflections at an interface between the PIC and the substrate.

Example 19 can include an optical circuit, comprising: a substrate having a substrate front surface, the substrate defining a cavity that extends into the substrate front surface, the cavity having at least one sidewall that extends toward a bottom of the cavity, the bottom of the cavity including a first plurality of surface tension self-alignment features, the cavity including a substrate reference surface that lacks surface tension self-alignment features; and a photonic integrated circuit (PIC) positioned within the cavity, the PIC having a PIC front surface that includes a plurality of electrical connections, the PIC having a PIC back surface that lacks electrical connections, the PIC back surface including a second plurality of surface tension self-alignment features, the PIC including a PIC reference surface that is parallel to the substrate front surface and lacks surface tension self-alignment features, the second plurality of surface tension self-alignment features being aligned to the first plurality of alignment features such that the PIC is aligned to the substrate in a plane that is parallel to the substrate reference surface, the PIC reference surface being in contact with the substrate reference surface such that the PIC is aligned to the substrate in a direction that is orthogonal to the substrate reference surface, the PIC including a PIC optical port that is aligned to a substrate optical port disposed on the substrate.

Example 20 can include the optical circuit of Example 19, wherein: the first plurality of surface tension self-alignment features and the second plurality of surface tension self-alignment features are configured to be in a liquid state under a specified physical condition; and the first plurality of surface tension self-alignment features is configured to self-align via surface tension to the second plurality of surface tension self-alignment features when the first plurality of surface tension self-alignment features and the second plurality of surface tension self-alignment features are in the liquid state.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. An optical circuit, comprising:
   a substrate having a substrate front surface,
      the substrate defining a cavity that extends into the substrate front surface,
      the cavity having at least one sidewall that extends toward a bottom of the cavity,
      the bottom of the cavity including a first plurality of surface tension self-alignment features,
      the cavity including a substrate reference surface that lacks surface tension self-alignment features,
      the sidewall including a substrate optical port, and
      the substrate including an optical path that extends through the substrate from a connector optical port to the substrate optical port; and
   a photonic integrated circuit (PIC) attachable to the substrate,
      the PIC having a PIC front surface that includes a plurality of electrical connections,
      the PIC having a PIC back surface, wherein the PIC back surface lacks electrical connections and includes a second plurality of surface tension self-alignment features,
      the second plurality of surface tension self-alignment features being aligned to the first plurality of alignment features such that the PIC is aligned to the substrate in a plane that is parallel to the substrate reference surface,
      the PIC having a PIC edge surface that extends around at least a portion of a perimeter of the PIC between the PIC front surface and the PIC back surface,
      the PIC having a PIC optical port disposed on the PIC edge surface and configured to accept or emit an optical beam along a PIC optical axis, and
      the PIC optical axis being aligned with the substrate optical port when the PIC is attached to the substrate.

2. The optical circuit of claim 1, wherein:
   the first plurality of surface tension self-alignment features is configured to self-align via surface tension to the second plurality of surface tension self-alignment features when the first plurality of surface tension self-alignment features is placed in contact with the second plurality of surface tension self-alignment features.

3. The optical circuit of claim 2, wherein:
the first plurality of surface tension self-alignment features and the second plurality of surface tension self-alignment features are configured to be in a liquid state under a specified physical condition; and
the first plurality of surface tension self-alignment features is configured to self-align via surface tension to the second plurality of surface tension self-alignment features when the first plurality of surface tension self-alignment features and the second plurality of surface tension self-alignment features are in the liquid state.

4. The optical circuit of claim 2, wherein:
the PIC includes a PIC reference surface that lacks surface tension self-alignment features;
the substrate reference surface that lacks surface tension self-alignment features; and
the PIC reference surface is configured to contact the substrate reference surface to align the PIC to the substrate along a direction that is orthogonal to the substrate reference surface.

5. The optical circuit of claim 4, wherein the PIC reference surface comprises an area of the PIC back surface that lacks surface tension self-alignment features.

6. The optical circuit of claim 4, wherein the first plurality of surface tension self-alignment features and the second plurality of surface tension self-alignment features are configured to align the PIC to the substrate in a plane that is parallel to the substrate reference surface.

7. The optical circuit of claim 2, wherein:
the PIC back surface includes PIC back surface corners;
the first plurality of surface tension self-alignment features are located in a periphery of the PIC back surface proximate the PIC back surface corners;
the cavity includes cavity corners; and
the second plurality of surface tension self-alignment features are located in a periphery of the cavity proximate the cavity corners.

8. The optical circuit of claim 2, wherein:
the bottom of the cavity includes a first area;
the substrate includes a substrate back surface opposite the substrate front surface; and
the substrate includes at least one aperture extending from the substrate back surface to the first area of the bottom of the cavity.

9. The optical circuit of claim 8, further comprising at least one thermal connection disposed in and extending through the at least one aperture, the at least one thermal connection comprising at least one material having a greater thermal conductivity than a thermal conductivity of the substrate.

10. The optical circuit of claim 1, wherein the substrate includes a lens integral with the substrate, the lens configured to collimate a beam emitted from the PIC along the PIC optical axis when the PIC is attached to the substrate or focus a beam directed toward the PIC along the PIC optical axis when the PIC is attached to the substrate.

11. The optical circuit of claim 1, wherein the substrate includes an isolator integral with the substrate, the isolator configured such that when the PIC is attached to the substrate, the isolator passes light that travels in a first direction along the optical path and blocks light that travels in a second direction opposite in the first direction along the optical path.

12. The optical circuit of claim 1, wherein the substrate includes a mirror integral with the substrate, the mirror configured to reflect light along the optical path within the substrate.

13. The optical circuit of claim 1, wherein the PIC lacks a lens, an isolator, and a mirror.

14. The optical circuit of claim 1, further comprising an integrated circuit configured to electrically connect to the plurality of electrical connections on the PIC and electrically connect to a second plurality of electrical connections on the front surface of the substrate.

15. The optical circuit of claim 1, comprising an index-matching material disposed between the PIC edge surface and the at least one sidewall of the cavity, the index-matching material configured to reduce reflections at an interface between the PIC and the substrate.

16. The optical circuit of claim 1, wherein the PIC back surface lacks electrical connections.

17. A method for assembling an optical circuit, the method comprising:
providing a substrate, the substrate having a substrate front surface and defining a cavity that extends into the substrate front surface, the cavity having at least one sidewall that extends toward a bottom of the cavity, the bottom of the cavity including a first plurality of surface tension self-alignment features, the cavity including a substrate reference surface that lacks surface tension self-alignment features;
positioning a photonic integrated circuit (PIC) within the cavity, the PIC having a PIC front surface that includes a plurality of electrical connections, a PIC back surface lacking electrical connections, a second plurality of surface tension self-alignment features located on the PIC back surface, and a PIC reference surface that lacks surface tension self-alignment features;
automatically aligning the second plurality of surface tension self-alignment features to the first plurality of surface tension self-alignment features, via surface tension in the first and second pluralities of the surface tension self-alignment features, to align the PIC to the substrate in a plane that is parallel to the substrate reference surface; and
contacting the PIC reference surface against the substrate reference surface to align the PIC to the substrate in a direction that is orthogonal to the substrate reference surface,
such that when the PIC is aligned to the substrate in the plane that is parallel to the substrate reference surface and in the direction that is orthogonal to the substrate reference surface, a PIC optical port disposed on the PIC is aligned to a substrate optical port disposed on the substrate.

18. The method of claim 17, further comprising:
positioning a refractive index-matching material between a PIC edge surface and the at least one sidewall of the cavity to reduce reflections at an interface between the PIC and the substrate.

19. An optical circuit, comprising:
a substrate having a substrate front surface,
the substrate defining a cavity that extends into the substrate front surface,
the cavity having at least one sidewall that extends toward a bottom of the cavity,
the bottom of the cavity including a first plurality of surface tension self-alignment features, and
the cavity including a substrate reference surface that lacks surface tension self-alignment features; and a photonic integrated circuit (PIC) positioned within the cavity,
the PIC having a PIC front surface that includes a plurality of electrical connections,
the PIC having a PIC back surface that lacks electrical connections,
the PIC back surface including a second plurality of surface tension self-alignment features,
the PIC including a PIC reference surface that is parallel to the substrate front surface and lacks surface tension self-alignment features,
the second plurality of surface tension self-alignment features being aligned to the first plurality of alignment features such that the PIC is aligned to the substrate in a plane that is parallel to the substrate reference surface,
the PIC reference surface being in contact with the substrate reference surface such that the PIC is aligned to the substrate in a direction that is orthogonal to the substrate reference surface, and
the PIC including a PIC optical port that is aligned to a substrate optical port disposed on the substrate.

20. The optical circuit of claim 19, wherein:

the first plurality of surface tension self-alignment features and the second plurality of surface tension self-alignment features are configured to be in a liquid state under a specified physical condition; and the first plurality of surface tension self-alignment features is configured to self-align via surface tension to the second plurality of surface tension self-alignment features when the first plurality of surface tension self-alignment features and the second plurality of surface tension self-alignment features are in the liquid state.

* * * * *